Nov. 11, 1969      A. C. WISE      3,477,321
STOP GAUGE
Filed May 18, 1967

INVENTOR
ARTHUR C. WISE

BY
Oberlin, Maky, Donnelly & Renner
ATTORNEYS

United States Patent Office 3,477,321
Patented Nov. 11, 1969

3,477,321
STOP GAUGE
Arthur C. Wise, 205 Pioneer Trail,
Aurora, Ohio 44202
Filed May 18, 1967, Ser. No. 639,508
Int. Cl. B23b *3/36;* G01b *5/14, 3/00*
U.S. Cl. 82—34                     3 Claims

ABSTRACT OF THE DISCLOSURE

A stop gauge for use with machine tools and the like for gauging accurate end positions of slide movement comprising a lost motion extension of the stop rod and a wedge block mechanism and dial indicator for sensing the extent of movement through the lost motion connection.

---

Figure 1:
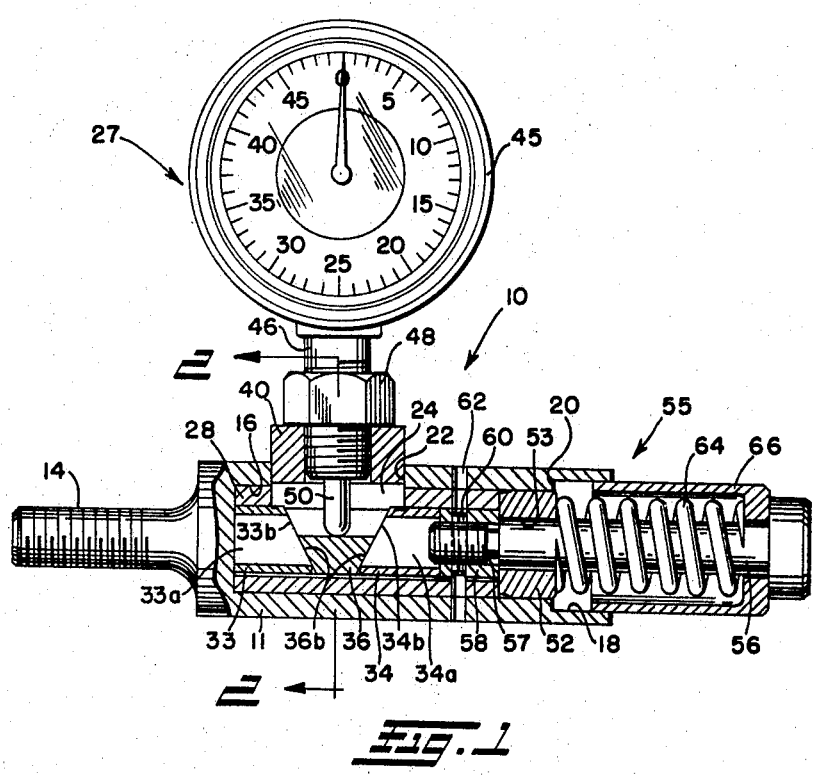

The apparatus of this invention relates to machine tools wherein it is desired to gauge very accurate end dimensions, but more particularly to lathe type machinery which utilizes a stop rod and stop screw arrangement for disengaging the feed mechanism of any particular slide.

In this machinery, it is normal to perform operations such as turning, facing or necking in an automatic manner wherein the tool-bearing slide is coupled to the drive mechanism of the machine and continues the operation until it is decoupled by abutment with an adjustable stop mechanism.

The stop mechanism usually comprises a stop rod which is fixedly mounted in relation to the machine tool and which serves to disengage the longitudinal feed of the carriage, for example, when it is abutted by the carriage at the end of its travel. A stop spool mounted on the carriage consists of a plurality of screws which are presettable in their extension from the carriage and which may be selectively indexed into abutting relation with the stop rod. Thus, in normal operation the abutment of a particular stop screw carried by the carriage with the stop rod serves to disengage the drive mechanism.

The stop gauge of this invention is normally threaded into the end of the stop rod to be engaged by the stop screw and the carriage to provide the knock-off of the feed mechanism and then to allow an accurately gaugeable amount of further travel of the carriage for bringing the cutting tool to critical end dimensions.

Stop gauges of this type have been used in the past and have found widespread acceptance, however, it is obvious that such stop gauge must combine the features of adequate rigidity and strength in order to disengage drive mechanisms which might require on the order of 300 pounds of force and yet be a delicate instrument which must gauge dimensions on the order of ten thousandths of an inch. It is also obvious that it is necessary that such a stop gauge provide a wide range of gauging while still maintaining adequate strength and rigidity in order to have maximum versatility.

Therefore, it is an object of this invention to provide an improved stop gauge which provides increased length of travel over prior art devices of this type and which is sturdier and more rigid than prior devices.

It is another object of this invention to provide an improved stop gauge of superior construction which utilizes a unique mechanism for converting longitudinal travel of the slide into radial motion for sensing by an indicator gauge which may then be positioned in a preferred orientation clear of interference with other structures of the machine tool and readily accessible to the operator.

It is still another object of this invention to provide a stop gauge of improved construction which prevents the entrance of moisture, coolant, foreign matter and the like into the critical sensing area of the gauge.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
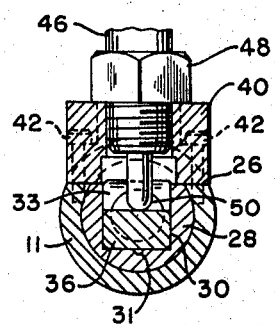

In said annexed drawings:
FIG. 1 is a partial cross-sectional view in elevation of the stop gauge of this invention;
FIG. 2 is a cross-sectional view taken along the lines 2—2 of FIG. 1.

Referring now to FIG. 1, the construction of the stop gauge 10 comprises a cylindrical body 11 necked down and threaded at one end 12 to provide a screw 14 for engagement with a threaded hole in the end of a stop rod. The stop gauge 10 will thus be in axial alignment with the stop rod of a machine tool mechanism. The interior of the body 11 is machined to form an axial bore therein consisting of an inner bore 16, a larger outer bore 18 and a connecting stepped portion 20. The body 11 is further machined transversely as at 22 to provide an aperture 24 for access to the interior of the body 11 and to provide a flat surface 26 for mounting of the gauging mechanism 27. The body 11 is preferably made of cooled rolled steel but may be of any material which provides sufficient strength and rigidity for the relatively strong forces which must be transmitted therethrough. Located within the inner bore 16 of the body 11 is a sleeve 28 which is pressed into place and which has a rectangular broached passage 30 therein including a groove 31 in the bottom central portion thereof. Located within the rectangular passage 30 of the sleeve 28 are a pair of rectangular sliding blocks 33, 34 formed of heat treated steel, each respectively having a central bore 33*a*, 34*a* therein and an angled face 33*b*, 34*b*. The blocks 33, 34 are dimensioned for a sliding fit within the passage 30 of the sleeve 28 and one block 33 is positioned against the end wall of the inner bore 16 of the body 11 with its angled face 33*b* toward the right as viewed in FIG. 1. The second block 34 is positioned in the passage 30 with its angled face 34*b* toward the left as viewed in FIG. 1. A lift block 36 is positioned between each of the sliding blocks 33, 34 and consists of a rectangular piece of heat treated steel machined to have angled faces 36*b* on either end thereof of an angle corresponding to the angled faces 33*b*, 34*b* of the sliding blocks 33, 34. The angle of the faces 33*b*, 34*b*, 36*b* in this particular embodiment is approximately 26° as measured from the vertical, however, this particular angle is not intended as a limitation since many different angles may be utilized to obtain different relative movements between the blocks 33, 34, 36. It will be appreciated that as the sliding block 34 is moved axially to the left as viewed in FIG. 1, the lift block 36, due to the cooperation of the angled faces 33*b*, 34*b*, 36*b* will move in generally radial upward direction.

A cover 40 consisting of a rectangular piece of steel having a threaded central bore is mounted in the aperture 22 of the body 11 and is retained in position by four bolts 42 at the corners thereof threaded into the body 11. A dial indicator 45 having a threaded mounting stem 46 is radially mounted in the threaded bore of the cover 40 and is retained in position therein by a lock nut 48. The probe 50 of the dial indicator 45 protrudes within the interior of the body 11 and abuts the lift block 36 to sense the radial movement of the block 36. The dial indicator 45 may be of any suitable manufacture having a sufficient range to indicate the full extent of movement of the lift block 36 and in this particular embodiment includes a probe 50 having a rounded abutment end.

Located within the nner bore 16 of the body 11 of the stop guage 10 at the righthand end thereof as viewed in FIG. 1, is a circular sleeve 52 which is press fit into place and which has concentric axially extending inner bore 53.

A motion transmitting mechanism 55 providing a lost motion connection is located at the righthand end of the body 11 of the stop gauge 10 and consists of a bolt 56 having a body of a dimension suitable for a sliding fit within the sleeve 52 and a stepped down threaded lefthand end 57. A sliding nut 58 is located within the rectangular passage 30 of the sleeve 28 at the righthand end thereof and has a threaded central bore for engaging the threaded end 57 of the bolt 56. The nut 58 is of a dimension to provide a sliding fit within the rectangular passage 30 and both the nut 58 and the threaded portion of the bolt 56 are locked together by means of a roll pin 60 which is inserted through a radially extending bore 62 in the sleeve 28 and the body 11 of the stop gauge 10. Thus, the nut 58 which abuts against the inner face of the sleeve 52 serves to retain the bolt 56 in position in relation to the stop gauge 10.

A spring 64 and spring retainer 66 are located on the body of the bolt 56 between the sleeve 52 and the underside of the head of the bolt 56 and the spring retainer 66 is dimensioned for a sliding fit within the outer bore 18 of the body 11 of the stop gauge 10. When the apparatus of the stop gauge 10 is assembled, the spring retainer 66 and the bolt 56 will attain the normal unoperated position as shown in FIG. 1, under the bias of the spring 64, with a clearance between the lefthand end of the spring retainer 66 and the stepped portion 20 of the body 11 of the stop gauge. It will be understood that this clearance provides a lost motion distance between the spring retainer 66 and the body 11 of the stop gauge 10 which could be adjustable by the extent the bolt 56 is threaded into the sliding nut 58 to compress the spring 64. However, only one such maximum distance is usually selected for the stop gauge 10 to provide adequate rigidity and strength and is maintained by pinning the nut 58 to the threaded portion 57 of the bolt 56 with the roll pin 60.

The head of the bolt 56 is in position to be abutted by the stop roll mechanism carried by the carriage of the machine tool when the carriage approaches the limit of its longitudinal movement and it will be clear that the following operation of the stop gauge 10 mechanism occurs. The strength of the spring 64 is selected for the particular machine tool with which the stop gauge 10 of this invention is utilized and is usually in the range of 100–300 pounds of pressure to compress the spring. This spring selection depends upon the amount of force required to disengage the feed drive mechanism of the particular machine tool. Thus, when the bolt 56 is initially abutted by the stop screw, continued movement of the carriage toward the left as viewed in FIG. 1 will cause relative movement of the stop roll to disengage the drive mechanism, any relative movement of the stop gauge 10 through its lost motion distance being prevented by the bias of the spring 64 tending to separate the body 11 of the stop gauge 10 and the bolt 56. As the feed drive is disconnected the stop roll engages a fixed stop and is prevented from further longitudinal movement.

Continued movement of the carriage of the machine tool may be undertaken manually by the operator of the machine in order to accurately finish a cutting operation at a precise dimension. Thus, continued movement of the carriage to the left will cause the bolt 56 to be moved therewith relative to the body 10 of the stop gauge 11 compressing the spring 64. The motion of the bolt 56 will be transmitted to the sliding nut 58 through the threaded engagement therebetween. The sliding nut 58 will in turn, cause movement of the slide block 34 to the left and a subsequent radial movement of the lift block 36 due to the wedging action of the angled faces of the blocks 33, 34, 36. Such radial movement of the lift block 36 will be monitored by the dial indicator 45 through the abutment of the lift block 36 with the probe 50 of the indicator 45 and an accurate gauging of the longitudinal movement of the carriage may be obtained.

Such movement of the carriage may continue through the complete lost motion distance provided by the stop gauge 10 until the spring retainer 66 abuts the stepped portion 20 of the body 11 of the stop gauge 10. It will be appreciated that this type of construction also provides a safety factor in that the probe 50 of the dail indicator 45 will not be moved beyond its permissible extent of travel even when the carriage is accidentally brought into engagement with the stop gauge mechanism. When the carriage is moved to the right away from the stop gauge 10, the bias of the spring 64 will return the bolt 56, the spring retainer 66 and the sliding nut 58 to the original unoperated position. The spring return of the dial indicator 45 itself will be sufficient to restore the probe 50, the lift block 36 and the sliding block 34 to their original positions as shown in FIG. 1.

It will be understood that the motion converting mechanism of the stop gauge 10 consisting of the slide blocks 33, 34 and the lift block 36 provides an extremely accurate yet rugged mechanism for gauging movement of a portion of a machine tool. The movement of the lift block 36 is in a leftward and upward direction maintaining the upper surface of the lift block 36 parallel to its original position due to the accuracy with which the angled faces 33b, 34b are machined. Thus, there will be no relative radial movement between the lift block 36 and the probe 50 of the dial indicator 45, movement being limited to a leftward sliding movement of the block 36 relative to the probe 50 so that the probe 50 senses the flat upper surface of the block 36.

It will be clear that other angles may be employed for the faces of the blocks 33, 34, 36 in order to alter the mechanical advantage of the system and the range of indication for the stop gauge 10. However, the embodiment set forth in this specification is the preferred embodiment in providing a sufficient range commensurate with smoothness and accuracy of indication.

Other modes of applying the principles of the invention may be employed, change being made as regards the details described, provided the features stated in any of the following claims or the equivalent of such be employed .

I, therefore, particularly point out and distinctly claim as my invention:

1. A stop gauge for stop bar knock-off mechanisms in lathe-type machine tools and the like, comprising a body having an axial bore therein and a closed threaded end for attachment to a stop rod, a member slidably mounted in the open end of the bore of said body for limited axial movement relative to said body upon engagement by a movable portion of the machine tool, a spring mounted between said body and said member for biasing said member away from said body with a predetermined force so that relative axial movement between said member and said body occurs only when such force is exceeded, a dial indicator responsive to radial movement mounted on said body for indicating the quantity of relative axial movement of said member, and a pair of cooperable cam elements slidably mounted in the axial bore of said body for converting the relative axial movement of said member to radial movement for actuating said dial indicator, one of said pair of cam elements being axially movable with said first mentioned member and the other of said pair of cam elements being radially movable and engaging said dial indicator.

2. A stop gauge as set forth in claim 1 wherein said pair of cam elements comprises an axially slidable block and a lift block, said axially slidable block having an axially disposed angled face and said lift block having a matching angled face disposed in abutting relation whereby relative axial movement of said axially slidable block causes radial movement of said lift block.

3. A stop gauge as set forth in claim 2 further including an element having an axially disposed angular face mounted in the bore of said body for cooperation with a second matching angled face of said lift block whereby said lift block is moved in a generally radial direction by the relative closure of said element and said axially slidable block.

References Cited

UNITED STATES PATENTS 2,604,000    7/1952    Kjellberg.
2,691,914    10/1954    Roby.

LEONIDAS VLACHOS, Primary Examiner

U.S. Cl. X.R.

33—181